United States Patent [19]
Lee et al.

[11] Patent Number: 5,671,292
[45] Date of Patent: Sep. 23, 1997

[54] HIGH SPEED DIGITAL IMAGE PATTERN MATCHING CIRCUIT

[75] Inventors: Young Lee; Nam-Soo Moon, both of Kyonggi-do, Rep. of Korea

[73] Assignee: Hyundai Electronics Industries Co., Ltd., Rep. of Korea

[21] Appl. No.: 473,337

[22] Filed: Jun. 7, 1995

[30] Foreign Application Priority Data

Dec. 30, 1994 [KR] Rep. of Korea ............ 94-39526

[51] Int. Cl.[6] ............................................ G06K 9/62
[52] U.S. Cl. ............................. 382/218; 382/222
[58] Field of Search .................... 382/217, 218, 382/219, 222, 221, 270, 273, 209

[56] References Cited

U.S. PATENT DOCUMENTS

| | | | |
|---|---|---|---|
| 4,021,776 | 5/1977 | Tech | 340/146.3 |
| 4,119,946 | 10/1978 | Taylor | 340/146.3 |
| 4,301,486 | 11/1981 | Brown et al. | 360/99 |
| 5,014,330 | 5/1991 | Kobayashi et al. | 382/209 |
| 5,067,161 | 11/1991 | Mikami et al. | 382/100 |

*Primary Examiner*—Yon J. Couso
*Attorney, Agent, or Firm*—David M. Klein; Bryan Cave LLP

[57] ABSTRACT

A high speed digital image pattern matching circuit which recognizes an image pattern, and discriminates whether the recognized image pattern matches with a desired reference pattern and where pattern matching occurs. For discriminating whether a desired pattern is matched, an input pattern to be retrieved is digitally-modelled as two thresholds. The digitally modelled input image signal is blocked to have the same size as the reference pattern and compared with the reference pattern. The compared result is again compared with the thresholds for discriminating whether pattern matching occurs or not. The high speed digital image pattern matching circuit of the present invention utilizes two thresholds for modelling, thereby simplifying the input digital image signal in hardware and making processing speed very fast.

6 Claims, 5 Drawing Sheets

HIGH SPEED DIGITAL IMAGE PATTERN MATCHING CIRCUIT

BACKGROUND OF THE INVENTION

This invention relates to a high speed digital image pattern matching circuit which recognizes an image pattern, and discriminates whether the recognized image pattern matches a desired reference pattern and where pattern matching occurs.

In general, for measurement, inspection, recognition and guiding using computer vision, or for compression and restoration of an image in image processing, a digital image pattern matching circuit is used for establishing a reference pattern, comparing an input image pattern with the reference pattern, and discriminating whether the input image pattern is consistent with the reference pattern and where pattern matching occurs.

A conventional digital image pattern matching circuit is shown in FIG. 1.

The conventional digital image pattern matching circuit comprises: a signal separator 1 for separating an analog image signal (VS) into an analog luminance signal (AI), a horizontal synchronization signal (HS) and a vertical synchronization signal (VS); a synchronizing circuit 2 for generating synchronizing control signals (S1, S2, S3, S4, S5) according to the horizontal synchronization signal (HS), the vertical synchronization signal (VS), a frame horizontal size signal (LW) and a frame vertical size signal (LH), the synchronizing control signals (S1, S2, S3, S4, S5) being synchronized with one another; an A/D converter 3 for converting the analog luminance signal (AI) separated by the signal separator 1 into a digital image signal (DI[N]) of N bits according to a quantization constant; a counter 4 for counting the synchronizing control signal (S4) and for generating an address signal; a first memory 5 controlled by the synchronizing control signals (S3, S5) for storing and generating the output signal of the A/D converter 2 as a comparison pattern according to the address signal of the counter (4); a second memory 6 for storing and generating a reference pattern which is to be compared with the analog image signal (VS) for discriminating whether the reference pattern matches with the analog image signal (VS); and a microprocessor 7 for comparing the comparison pattern of the first memory 5 with the reference pattern of the second memory 6 and for discriminating whether the comparison pattern matches with the reference pattern.

In prior digital image pattern matching circuits, the image signal (VS) input of one frame is separated into the analog luminance signal (AI), the horizontal synchronization signal (HS) and the vertical synchronization signal (VS) by the signal separator 1.

Of the separated signals, the horizontal synchronization signal (HS) and the vertical synchronization signal (VS) are input to the synchronizing circuit 2 and synchronized with the frame horizontal size signal (LW) and the frame vertical size signal (LH), thus generating the synchronizing control signals (S1, S2, S3, S4, S5) are generated. The synchronizing control signals (S1, S2, S3, S4, S5) from the synchronizing circuit 2 are input to the A/D converter 3, counter 4 and the first memory 5.

The analog luminance signal (AI) is input to an input terminal (IN) of the A/D converter 3, sampled by the synchronizing control signal (S1), converted into the digital image signal (DI[N]) of N bits according to the quantization constant, generated through an output terminal (OUT) of the A/D converter 3 and stored in the memory 5.

The counter 4 counts the synchronizing control signal (S4) which is applied to a clock terminal (CLK) thereof and applies the address signal to an address terminal (ADD) of the first memory 5. The first memory 5 controlled by the synchronizing control signals (S3, S5) and sequentially stores the digital image signals (DI[N]) of N bits according to the output signal of the counter 4.

The microprocessor 7 applies the address signal to the memory 5 and receives the digital image signals (DI[N]) of N bits one by one, while receiving the reference pattern of the memory 6. Thereafter, the microprocessor 7 compares the input digital image pattern (DI[N]) with the reference pattern of the second memory 6 in software, retrieves the pattern matching and generates the retrieved result through a data bus.

In the prior art digital image pattern matching circuit, the memory 5 most have a large capacity and be operated at high speed because all the digital image signals (DI[N]) are stored in the memory 5. Furthermore, a highly efficient microprocessor 7 is required and software, e.g. machine code, should be contained in the memory 5 for operating the microprocessor 7.

SUMMARY OF THE INVENTION

An object of the present invention is to provide a high speed digital image pattern matching circuit wherein a comparison pattern of an input image signal is compared with a reference pattern without being stored in memory, and it is determined whether the comparison pattern of the input image signal matches with the reference pattern and where the pattern matching occurs.

In the high speed digital image pattern matching circuit according to the present invention, for discriminating whether a desired pattern is matched in an image signal, an input pattern to be retrieved is digitally-modelled using two thresholds. The digitally modelled input image signal is blocked to have the same size as the reference pattern and compared with the reference pattern. The compared result is again compared with the thresholds for discriminating whether pattern matching occurs or not. If the matching of the two patterns is detected, the matching is counted and the location value of the analog image signal is stored for discriminating whether the matching of the two patterns is achieved and where the matching occurs.

In summary, in the high speed digital image pattern matching circuit of the present invention, some or all of input patterns are modelled for determining, at high speed, the presence where desired patterns and the location of pattern matching occurs.

BRIEF DESCRIPTION OF THE DRAWINGS

Other objects of the present invention will become apparent from the following description in conjunction with the drawings, in which:

FIG. 1 is a prior art digital image pattern matching circuit diagram of;

DETAILED DESCRIPTION OF THE INVENTION

Figure 1:
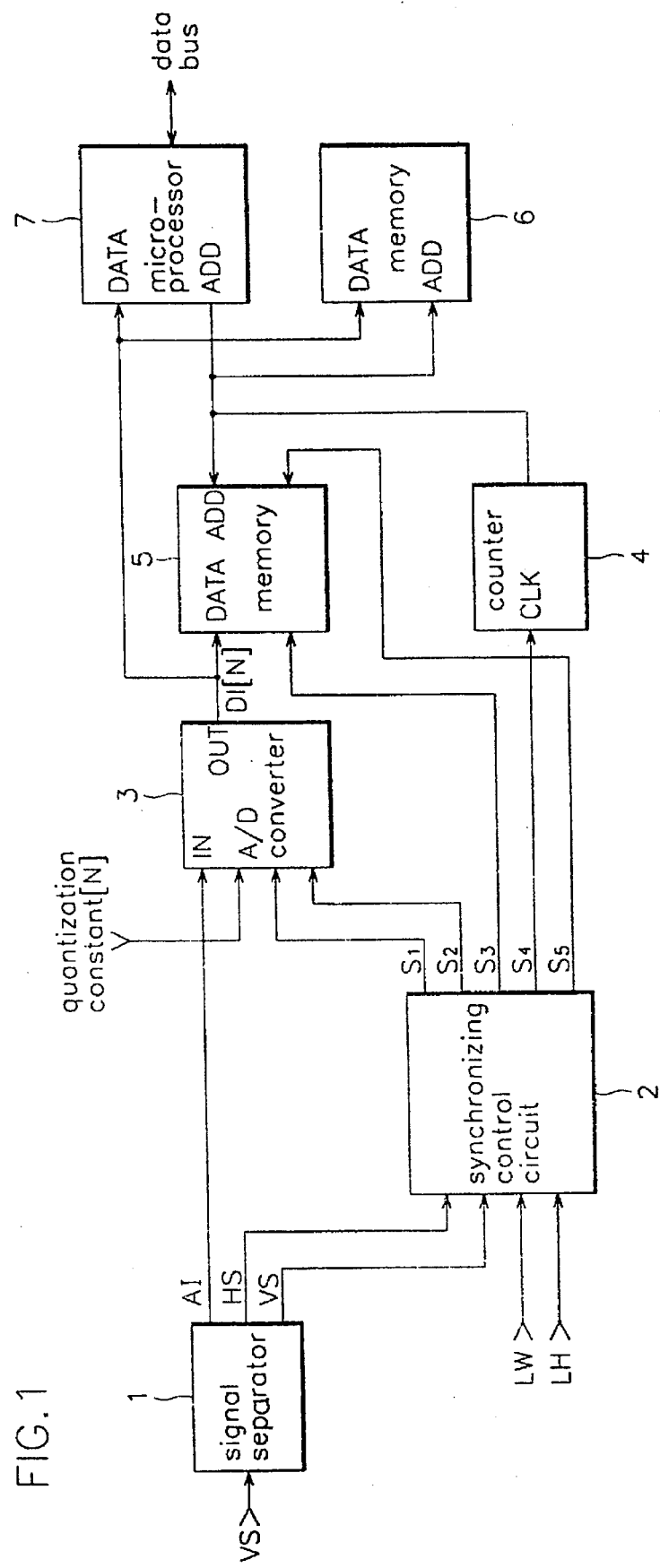
Figure 2:
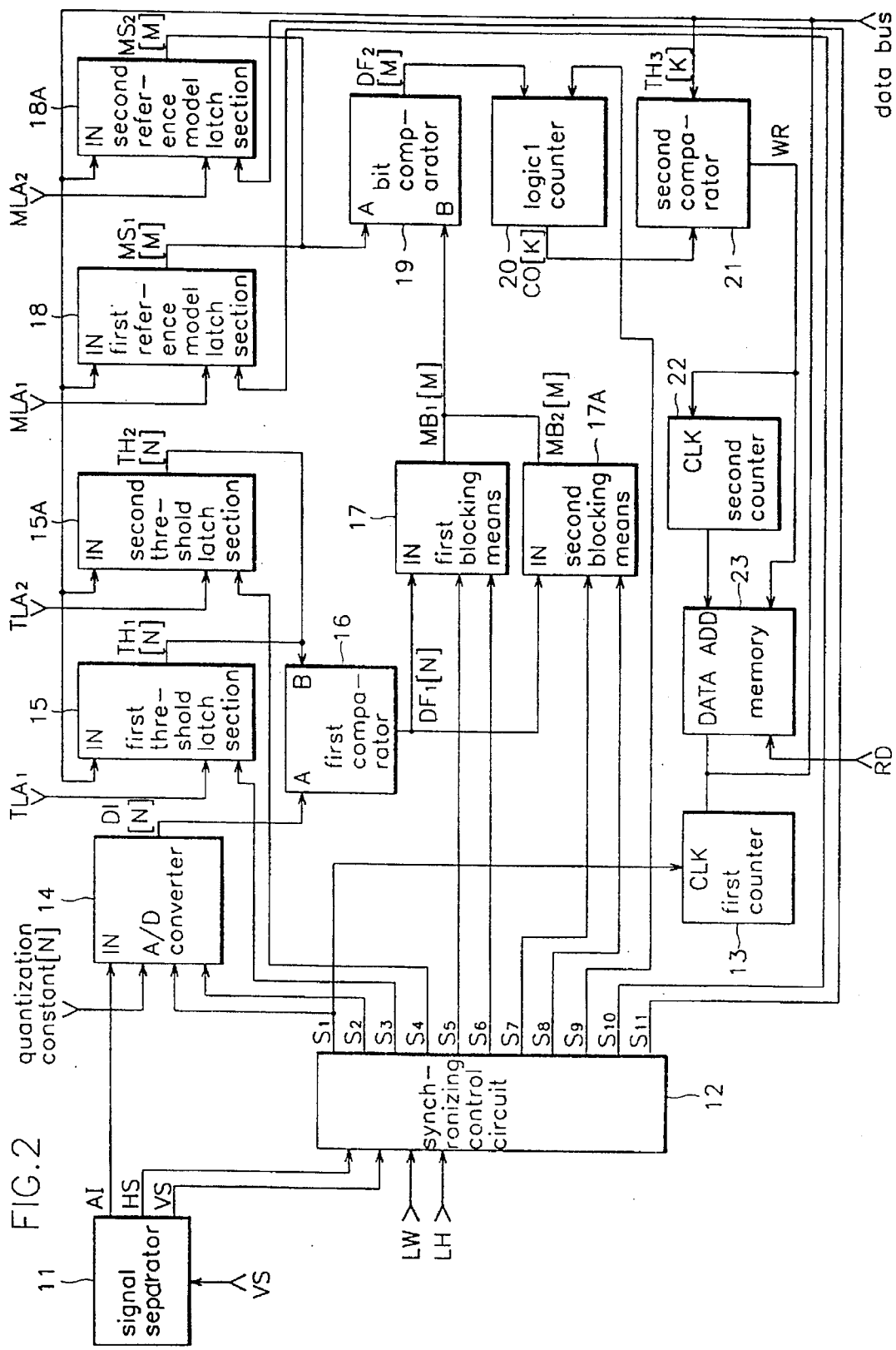
FIG. 2 is a high speed digital image pattern matching circuit diagram of the present invention.

Referring to the drawings, the high speed digital image pattern matching circuit of the present invention comprises a signal separator 11 for separating an analog image signal (VS) into an analog luminance signal (AI), a horizontal synchronization signal (HS) and a vertical synchronization signal (VS); a synchronizing control circuit 12 for generating synchronizing control signals (S1, S2, S3, S4, S5, S6, S7, S8, S9, S10, S11) according to the horizontal synchronization signal (HS) and the vertical synchronization signal (VS) separated by the signal separator 11, and according to a frame horizontal size signal (LW) and a frame vertical size signal (LH); a first counter 13 for counting the synchronizing control signal (S1); an A/D converter 14 for converting the analog luminance signal (AI) separated by the signal separator 11 into a digital image signal (DI[N]) of N bits according to a quantization constant; a first threshold latch section 15 and a second threshold latch section 15A for storing and generating thresholds (TH1[N]), (TH2[N]) which are applied through data buses according to latch for modelling of the digital image signal (DI[N]); a first comparator 16 for sequentially comparing the output signal of the A/D converter 14 and the thresholds (TH1[N]), (TH2[N]) stored in the first threshold latch 15 and the second threshold latch 15A during one cycle of the synchronizing control signal (S1); a first blocking means 17 and a second blocking means 17A for blocking an image modeling signal (DF1[M]) which is the compared result value sequentially generated by the first comparator 16, to have the same size as a reference model; a first reference model latch section 18 and a second reference model latch section 18A for storing and generating reference models (MS1[M]), (MS2[M]) which are applied through data buses and according to latch signals (MLA1), (MLA2); a bit comparator 19 for performing the function of the logical exclusive-OR with respect to the output signals (MB1[M]), (MB2[M]) of the first blocking means 17 and the second blocking means 17A with the reference models (MS1[M]), (MS2[M]) of the first reference model latch 18 and a second reference model latch 19; a logic 1 counter 20 for counting the number of bits of the logic 1 from an output signal (DF2[M]) of the bit comparator 19; a second comparator 21 for comparing a matching threshold (TH3[K]) applied through data bus with the output signal (CO[K]) of the logic 1 counter 20 and for generating writing control signal (WR) when the matching threshold (TH3[K]) is larger than the output signal (CO[K]); a second counter 22 for counting the writing control signal (WR) of the second comparator (21); and a memory 23 for storing the output signal of the first counter 13 in an address designated by the second counter 22 according to the writing control signal (WR) and for generating the output signal of the first counter 13 through data bus according to read signal (RD).

As described-above, when the digital image signal (DI[N]) is larger than the thresholds (TH1[N]), (TH2[N]) of the first threshold latch section 15 and the second latch section 15A, the first comparator 16 generates logic 1 for modelling the digital image signal (DI[N]).

Figure 3:
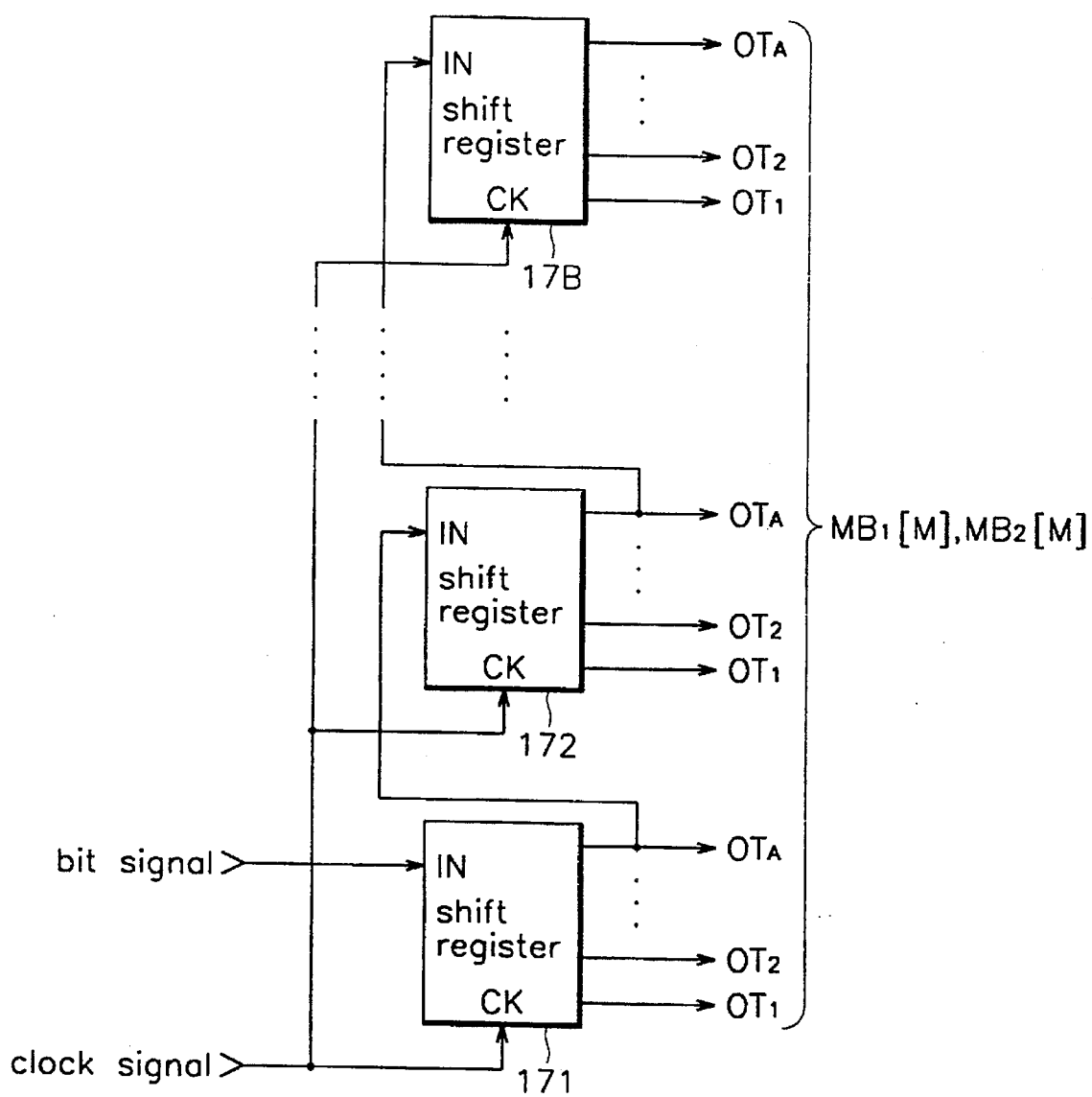
FIG. 3 is a detailed view of the blocking means of FIG. 2.

As shown in FIG. 3, the first blocking means 17 and the second blocking means 17A consist of a plurality of shift registers 171, 172, . . . 17B, which are connected in series, thereby sequentially shifting the image modeling signal (DF1[N]) of the first comparator 16 and blocking the image modelling signals (DF1[N]) to have the same size of the reference models (MS1[M]), (MS2[M]) which are stored in and generated from the reference model latch sections 18 and 18A.

Figure 4:
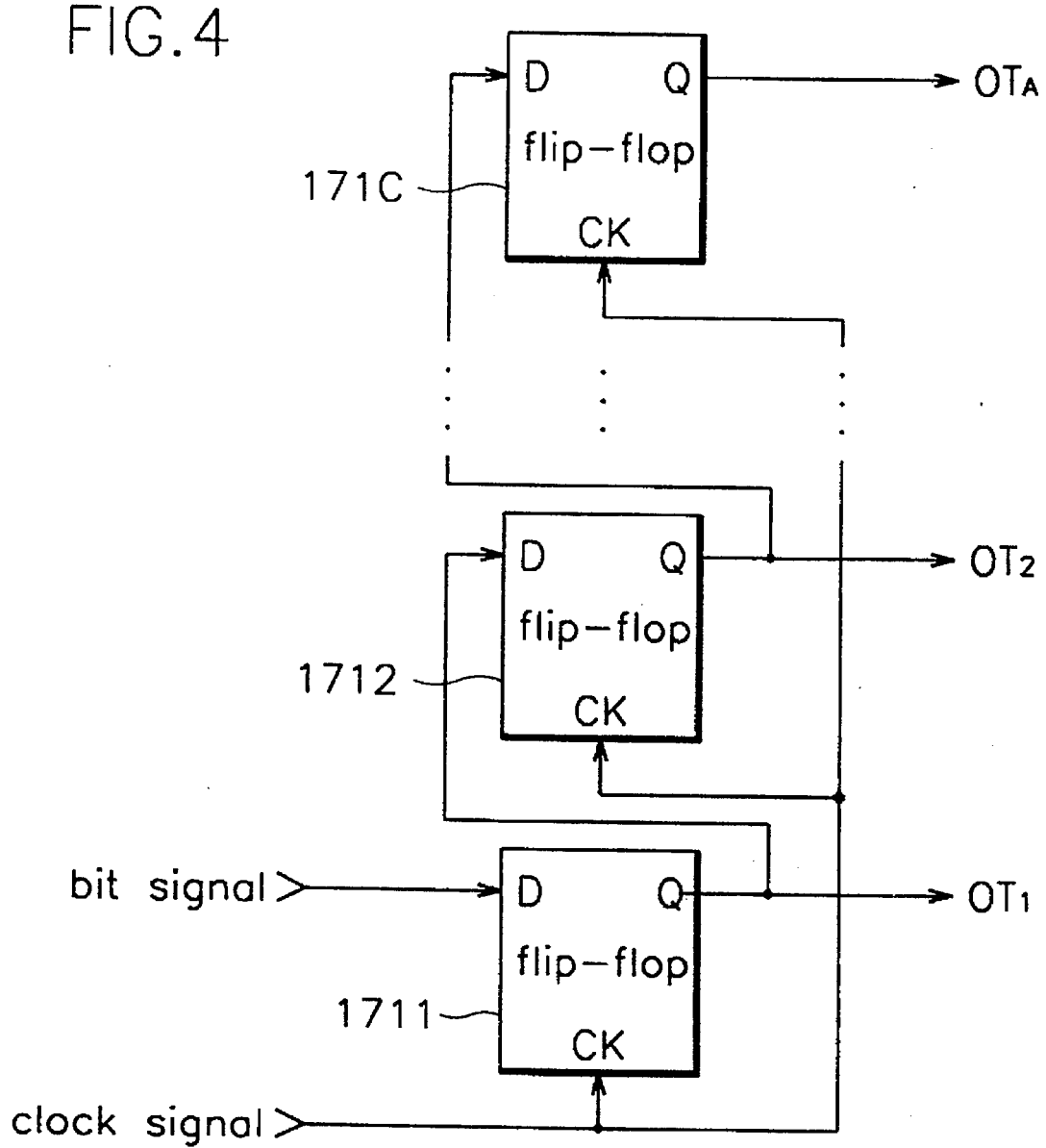
FIG. 4 is a detailed view of a first shift register of FIG. 3.
Figure 5:
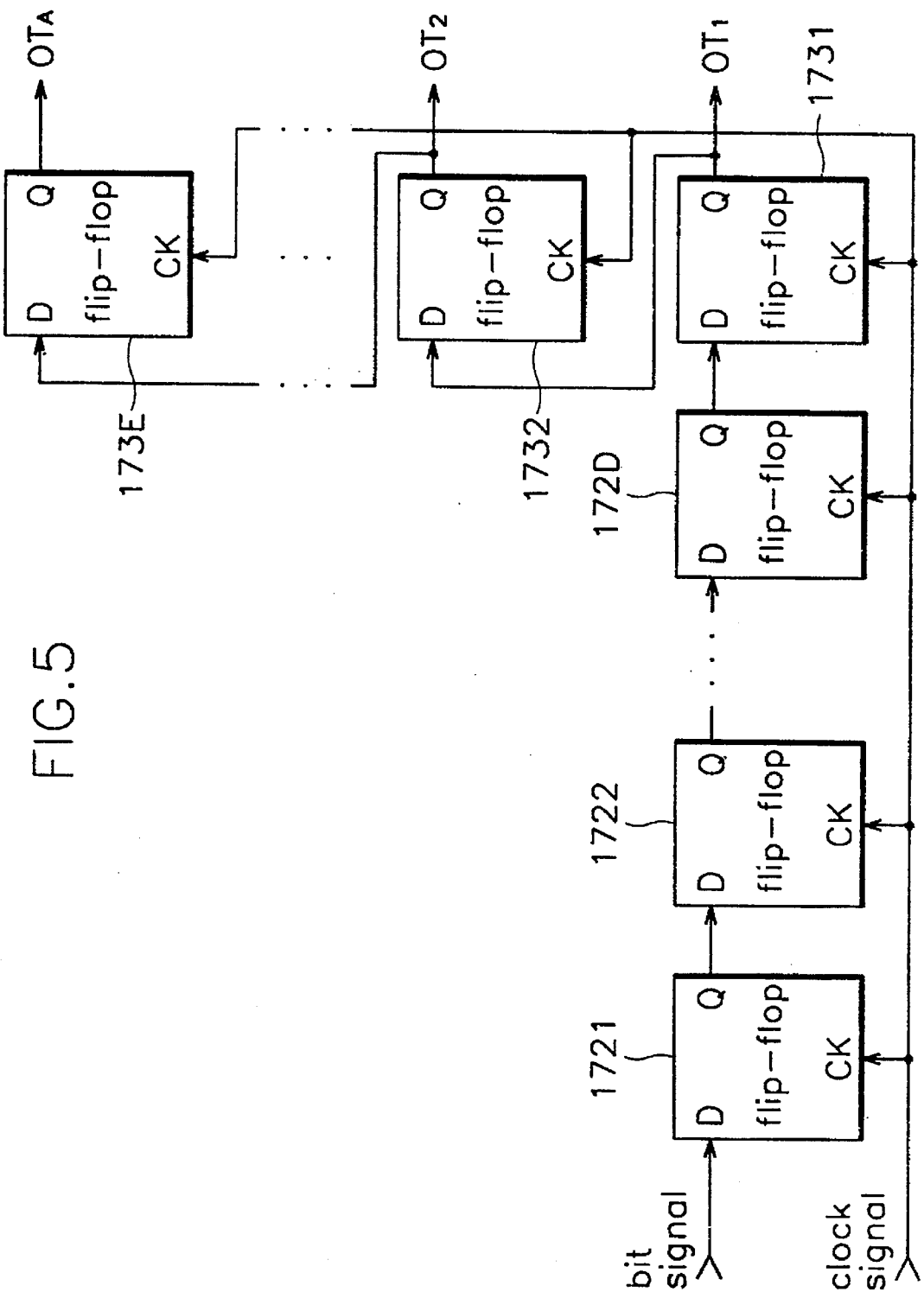
FIG. 5 is a detailed view of the last two shift registers of FIG. 3.

The shift registers 171, 172, . . ., 17B shown in FIG. 3 constituting the first blocking means 17 and the second blocking means 17A are shown in FIGS. 4 and 5.

Of the shift registers 171, 172, . . . , 17B constituting the first blocking means 17 and the second blocking means 17A, FIG. 4 shows a circuit of the first shift register 171 to which bit signals and shift clock signals are directly input. As shown, a plurality of flip-flops 1711, 1712, . . . , 171C are connected in series for shifting and generating bit signals according to clock signals.

FIG. 5 shows a circuit of the last two shift registers 17B-1, 17B of FIG. 3. As shown, a plurality of flip-flops 1721, 1722, . . . , 172D are connected in series for shifting bit signals sequentially according to clock signals. Furthermore, by connecting a plurality of flip-flops 1731, 1732, . . . , 173E to the output terminal (Q) of the flip-flop 172D in series, the bit signals of the flip-flop 172D are sequentially shifted and generated.

In the high speed digital image pattern matching circuit of the present invention, an analog image signal (VS) of NTSC or PAL type is input to the signal separator 11 and separated into the analog luminance signal (AI), the horizontal synchronization signal (HS) and the vertical synchronization signal (VS). The separated horizontal synchronization signal (HS) and the vertical synchronization signal (VS) are input to the synchronizing control circuit 12 and combined with the frame horizontal size signal (LW) and the frame vertical size signal (LH) for generating the synchronizing control signals (S1, S2, S3, S4, S5, S6, S7, S8, S9, S10, S11). The analog luminance signal (AI) is converted into the digital image signal (DI[N]) by the A/D converter 14.

The A/D converter 14 samples the analog luminance signal (AI) according to the synchronizing control signal (S1) and converts the analog luminance signal (AI) into the digital image signal (DI[N]). The frequency of the synchronizing control signal (S1) is determined by the multiplication (HS*LW) of the frame horizontal size signal (LW) and the horizontal synchronization signal (HS). The number of bits (N) of the digital image signal (DI[N]) is determined by the quantization constant (N) which is applied to the A/D converter.

The output digital image signal (DI[N]) of the A/D converter 14 is input to the input terminal (A) of the first comparator 16, while the thresholds (TH1[N]), (TH2[N]) which are input through the data bus, and stored in and generated from the first threshold latch section 15 and the second threshold latch section 15A according to the latch signals (TLA2), (TLA2), are applied to the input terminal B of the first comparator 16. Thereafter, the first comparator 16 compares the digital image signal (DI[N]) with the thresholds (TH1[N]), (TH2[N]) sequentially during one cycle of the control signal S1 and generates the compared result.

When the digital image signal (DI[N]) is larger than the thresholds (TH1[N]), (TH2[N]), the comparator 16 generates logic "1".

The compared result signal (DF1[N]) generated by the first comparator 16, i.e., the modelling information of the input image signal, is input to the first blocking means 16 and the second blocking means 17. In detail, the compared result signal (DF1[N]) which has been compared with the threshold (TH1[N]) of the first threshold latch section 15 is input to the first blocking means 17, while the compared result signal (DF1[N]) which has been compared with the threshold (TH2[N]) is input to the second blocking means 17A. The compared signals (DF1[N]) are then blocked into the size of the reference model.

In the first blocking means 17 and the second blocking means 17A, blocking is performed by converting the output signals of the first comparator 16 to have the same size as the reference model. As shown in FIGS. 4 and 5, the compared output values (DF1[N]) of the first comparator 16 are sequentially shifted by and generated from the shift registers 171, 172, ..., 171C which comprises a plurality of flip-flops 1771, 1772, ... 171C; 1721, 1722, ..., 172D; 1731, 173, ..., 173E.

The output signals (MB1[M]), (MB2[M]) of the first blocking means 17 and the second blocking means 17A are generated when the input image modelling data of predetermined numbers (MH−1)*LW+MW) is input to the first blocking means 17 and the second blocking means 17A according to the control of the synchronizing control circuit 12.

The output signals (MB1[M]), (MB2[M]) of the first blocking means 17 and the second blocking means 18 are input to the bit comparator 19 together with the reference models (MS1[M]), (MS2[M]) which are applied through data buses, stored in and generated from the first reference model latch section 18 and the second reference model latch section 18A. Thereafter, the comparator 19 compares the respective bit of the output signals (MB1[M]), (MB2[M]) and of the reference models (MS1[M]), (MS2[M]) by exclusive-OR.

The output signal (DF2[M]) of the bit comparator 19 is input to the logic 1 counter 20 and counted. The counter 20 generates the counted number of bits of logic 1 as coefficient signal (CO[K]) of K bits.

The coefficient signal (CO[K]) generated by the logic 1 counter is input to the second comparator 21 and compared with the matching threshold (TH3[K]) which in input through data bus.

The matching threshold (TH3[K]) stores block number where pattern matching occurs after pattern matching is completed. The matching threshold (TH3[K]) is stored in the memory 23 and read according to read signal and applied through data to the second comparator 21.

The second comparator 21 compares the matching threshold (TH3[K]) with the coefficient (CO[K]), and generates the compared results as writing signal (WR) when the matching threshold (TH3[K]) is larger than the coefficient signal (CO[K]).

The writing signal(WR) of the second comparator 21 is input to the second counter 22 and the memory 23. The second counter 22 counts the writing signal (WR) and applies the writing signal to the address terminal (ADD) of the memory 23. The memory 23 stores the count signal of the first counter 13 according to the address signal generated by the second counter 22 when the writing signal is generated.

The first counter 13 counts the synchronizing control signal (S1) and generates a location value, i.e., a block location, which discriminates the pattern match. The memory 23 stores the output signal of the first counter 13 when the pattern is matched.

After the pattern matching of one frame is finished as described-above, the data stored in the memory 23 stores block number where pattern matching occurs. Thereafter, the pattern matching of one input pattern and two reference models is discriminated. It is regarded that pattern matching occurs where the same block numbers are stored in blocks two times. The block number stored in the memory 23 is generated through data bus according to read signal (RD) and used for some purpose.

As described above, the high speed digital image pattern matching circuit of the present invention utilizes two thresholds for modelling, so as to simplify the input digital image signal in hardware, thereby making processing speed very fast.

The matter set forth in the foregoing descriptions and accompanying drawings is offered by way of illustration only and not as a limitation. The actual scope of the invention is intended to be defined in the following claims when viewed in their proper perspective based on the prior art.

What is claimed is:

1. A high speed digital image pattern matching circuit comprising:

a signal separator for separating an analog image signal into an analog luminance signal, a horizontal synchronization signal and a vertical synchronization signal;

a synchronizing control circuit for generating synchronizing control signals according to the horizontal synchronization signal and the vertical synchronization signal separated by the signal separator, a frame horizontal size signal and a frame vertical size signal;

a first counter for counting the synchronizing control signal and for generating a location value for a pattern being used for matching;

an A/D converter for converting the analog luminance signal separated by the signal separator into a digital image signal using a quantization constant;

a first threshold latch section and a second threshold latch section for storing and generating thresholds for modelling the digital image signal;

a first comparator for sequentially comparing the bits of the digital image signal and the thresholds stored in the first threshold latch and the second threshold latch during one cycle of the synchronizing control signal and for generating an image modelling signal comprising the compared results sequentially generated by the first comparator;

a first blocking means and a second blocking means for blocking the image modeling signal to have the same size as a reference model;

a first reference model latch section and a second reference model latch section for storing and generating reference models;

a bit comparator for performing a logical exclusive-OR function between the output signals of the first and second blocking means and the reference models of the first and second reference model latches;

a logical 1 counter for counting the number of logical 1 bits output from the bit comparator;

a second comparator for comparing a matching threshold with the output signal of the logical 1 counter and for generating a writing control signal when the matching threshold is larger than the output signal;

a second counter for counting the writing control signal of the second comparator; and a memory for storing the output signal of the first counter in an address designated by the second counter according to the writing control signal (WR).

2. The high speed digital image pattern matching circuit according to claim 1, wherein the first comparator generates a logical "1" when the digital image signal is larger than the thresholds of the first and second threshold latch section for modelling of the digital image signal.

3. The high speed digital image pattern matching circuit according to claim 1, wherein the first and second blocking means have a plurality of shift registers connected in series for sequentially shifting the input image modelling signals, and for converting the shifted signals into blocks which have the same size as the reference model.

4. The high speed digital image pattern matching circuit according to claim 3, wherein a first shift register of the plurality of shift registers has the same number of flip-flops connected in series as the number of output signals, the two last shift registers have a plurality of flip-flops connected in series, and the output signal of a last flip-flop is connected in series with the same number of flip-flops as the output signals of the shift register, for performing shifting and producing operation.

5. The high speed digital image pattern matching circuit according to claim 1, wherein the size of the model blocked by the first and second blocking means is determined by the multiplication of the number of shift registers of the first and second blocking means and the signal generated by each of the shift registers.

6. The high speed digital image pattern matching circuit according to claim 1, wherein the matching threshold of the second comparator is established by applying information about pattern matching stored in the memory through a data bus.

* * * * *